United States Patent [19]
Saruhan et al.

[11] Patent Number: 6,083,861
[45] Date of Patent: Jul. 4, 2000

[54] REACTION BONDED CERAMICS FOR CERAMIC COMPOSITE MATERIALS COMPRISING MULLITE AS THE MAIN COMPONENT AND CORUNDUM AND THORTVEITITE OR CERIANITE AS MINOR COMPONENTS

[75] Inventors: Bilge Saruhan, Troisdorf; Peter Mechnich, Köln; Hartmut Schneider, Rheinbach, all of Germany

[73] Assignee: DLR Deutsche Forschungsanstalt für Luft-und Raumfahrt e.V., Germany

[21] Appl. No.: 08/873,129

[22] Filed: Jun. 11, 1997

[30] Foreign Application Priority Data

Jun. 12, 1996 [DE] Germany .......................... 196 23 425

[51] Int. Cl.$^7$ .................................................. C04B 35/185
[52] U.S. Cl. .......................... 501/128; 501/152; 501/153
[58] Field of Search ..................................... 501/128, 152, 501/153

[56] References Cited

U.S. PATENT DOCUMENTS

| | | |
|---|---|---|
| 3,839,225 | 10/1974 | Acres . |
| 4,025,606 | 5/1977 | Acres . |
| 4,640,904 | 2/1987 | Hillig et al. ............................ 501/128 |
| 4,849,382 | 7/1989 | Shibata et al. . |
| 4,916,106 | 4/1990 | Koschlig et al. . |
| 4,935,390 | 6/1990 | Horiuchi et al. . |
| 5,294,576 | 3/1994 | Mizushima et al. ..................... 501/128 |
| 5,346,870 | 9/1994 | Noguchi et al. . |
| 5,843,859 | 12/1998 | Claussen ................................ 501/128 |

FOREIGN PATENT DOCUMENTS

| | | |
|---|---|---|
| 0 245 192 A2 | 11/1987 | European Pat. Off. . |
| 0 261 050 A2 | 3/1988 | European Pat. Off. . |
| 0 410 601 A2 | 1/1991 | European Pat. Off. . |
| 40 39 530 | 12/1991 | Germany . |
| 4039530 | 12/1991 | Germany . |
| 44 36 686 | 4/1996 | Germany . |
| 2 236 493 | 4/1991 | United Kingdom . |
| WO 85/01936 | 5/1985 | WIPO . |

OTHER PUBLICATIONS

Takashi, Nakamoto, *Patents Abstracts of Japan, Fiber Reinforced Ceramic Molded Body and Production Thereof*, Mar. 15, 1990, vol. 14/No. 137.

Abstract of JP 01282149 A (Derwent Information Ltd.), Sep. 23, 1993.

"Fabrication of low Shrinkage Mullite Zirconia Composites" Wu et al. Br Ceram Proc. (1989), 45 (Fabr. Technol.), 91–5 (1989).

"Fabrication & Properties of low shrinkage reaction bonded mullite" Wu et al. J Am Ceram Soc. (1991), 74(10), 2460–3.

"Processing & Properties of Reaction Bonded Aluminum Oxide (RBAO) & Mullite Ceramics" Claussen et al. Ceram Trans (1991), 22 (Ceram Pauden Sci.4) p. 631–46.

"Design & Processing of all oxide Composites" Lundberg et al. Ceram Trans (1995), 58 (High Temperature Ceramic Matrix Composites II) 95–104.

"Fabrication of low to zero shrinkage reaction bonded composites" Holz et al. J Europ. Ceram. Soc. (1996), 16 (2, Mullite 94), 255–60.

Principles & Processing of Reaction Bonded $Al_2O_3$ (RBAO) & Related Technology Dirscherl R et al. Bilateral Semin. Int'l Bur (1995), 20 (1$^{st}$ Slovene–German Seminar on Joint Projects in Materials Science & Technology 1994, 251–6.

*Primary Examiner*—Paul Marcantoni
*Attorney, Agent, or Firm*—Banner & Witcoff, Ltd.

[57] ABSTRACT

Reaction Bonded Ceramics for Ceramic Composite Materials Comprising Mullite as the Main Component and Corundum and Thortveitite or Cerianite as Minor Components The present invention pertains to reaction bonded mullite-containing ceramic molded parts, a process for their preparation and their use.

A particular embodiment of the present invention consists in reaction bonded mullite-containing ceramic molded parts, obtainable by the heat-treatment of a finely dispersed mixture of an aluminum-containing material, a silicon-containing material, and a rare earth metal-containing material in an oxygen-containing atmosphere.

11 Claims, No Drawings

REACTION BONDED CERAMICS FOR CERAMIC COMPOSITE MATERIALS COMPRISING MULLITE AS THE MAIN COMPONENT AND CORUNDUM AND THORTVEITITE OR CERIANITE AS MINOR COMPONENTS

The present invention pertains to reaction bonded mullite-containing ceramic molded parts, a process for their preparation and their use.

Long-fiber reinforced ceramic composite materials are to be employed as a thermal protection in combustion chambers of mobile and stationary turbines in order to achieve an increase of combustion temperature and thus a reduction of pollutant emission. Of critical importance, especially in turbines for aircraft power units, is the damage tolerance of this protection system in long-term use. A non-disastrous failure performance of the materials employed, for example, due to brittle fracture, is indispensable. This is to be enabled by the use of an oxide-based ceramic fiber composite material.

Due to its physicochemical properties, mullite ($Al_6Si_2O_{13}$, or $3Al_2O_3 \cdot 2SiO_2$) is a suitable matrix material for composite materials for use at high temperatures in an oxidizing atmosphere. These properties include, in particular:

high resistance to thermal shocks due to a low thermal expansion coefficient;

high creep resistance, even at high temperatures;

high chemical resistance, especially to oxidation;

relatively low thermal conductivity.

Conventional processes for the preparation of mullite-based composite materials, such as the sintering of mullite powders or the reaction sintering of aluminum oxides and silicon oxides, require process temperatures of above 1650° C. and are accompanied by high volume decreases of more than 20% by volume. This may result in damages to the material during its preparation. In addition, these process temperatures are far beyond the limit of thermal stability of all reinforcing fibers commercially available to date.

Another possibility for the preparation of long-fiber reinforced ceramic composite materials is hot-pressing. Mullite-matrix composite materials have already been prepared by this process, the final products being limited to simple shapes, such as plates, for example.

For some years, there have been studies in Germany and Sweden directed to developing an optimum RBM ("reaction bonded mullite") preparation process.

Brandt, J. & Lundberg, R.: Processing of Mullite-based Long-fibre Composites via Slurry Routes and by Oxidation of an Al—Si Alloy Powder, J. Eur. Cer. Soc. 16, 261–267 (1996), used an aluminum-silicon alloy (Al:Si=75:25), sintered mullite and MgO powder as an additive for accelerating the oxidation of the Al:Si alloy. The powders were homogenized and infiltrated in fibers in the form of slips. The process temperature varied between 1430° C. and 1600° C., the mullitization at 1430° C. remaining very low.

Claussen, N.: Reaktionsgebundener Mullit-haltiger Keramikformkörper, seine Herstellung und seine Verwendung (EP 0 531 378 B1); Holz, D., Pagel, S., Bowen, C., Wu, S. & Claussen, N.: Fabrication of Low-to-Zero Shrinkage Reaction-Bonded Mullite Composites, J. Eur. Cer. Soc. 16, 255–260 (1996), and Wu, S. & Claussen, N.: Reaction Bonding and Mechanical Properties of Mullite/Silicon Carbide Composites, J. Am. Ceram. Soc. 77 [11], 2898–904 (1994), describe the preparation of reaction-bonded mullite ceramics using aluminum metal, silicon carbide (SiC) and corundum ($\alpha$-$Al_2O_3$) wherein a substantial proportion of rubbed-off zirconia ($ZrO_2$) was additionally incorporated in the powders due to homogenization in an attritor. The powder compositions were spray-dried, processed into pellets and annealed a final temperatures of up to 1550° C.

Both developments mentioned above employ very high process temperatures (>1500° C.) in order to achieve a complete mullitization and a relatively high densification. However, in this temperature range, sufficient fiber stability of the reinforcing fibers is no longer ensured. By dry pressing, only a very low fiber content (10%) can be achieved. A high fiber content (>30%) and a homogeneous fiber distribution in the matrix can best be achieved, however, by wet processing (slip casting or slip infiltration).

Brandt and Lundberg (supra) observed that a small amount of MgO improved mullitization. At temperatures of between 1400° C. and 1500° C., however, MgO is liberated. This means that mullite ceramics preoared by this method contains MgO at the grain boundaries. The presence of free alkalis or alkaline earths in the matrix has to be avoided because of the formation of low-melting compounds or vitreous phases since otherwise the high-temperature creep resistance of the ceramics may be adversely affected.

The use of aluminum metal or aluminum-containing alloys as powders has a number of drawbacks:

(a) Due to its ductility, it is difficult to grind the relatively coarse aluminum powder to the required grain size (0.5 $\mu$m).

Milling in a ball mill in most cases only results in the formation of flat, flat-cake shaped grains. Because of the relatively large grains, the diffusion paths are enlarged, i.e. chemical inhomogeneities in the green body will result.

(b) The surface oxidation layer which is always present on the aluminum metal particles delays the further thorough oxidation to aluminum oxide. The exothermic character of the oxidation in combination with the relatively low melting point of aluminum (660° C.) involves the danger of local superheating and melt formation within an aluminum grain. Such melt can escape and leave a pore which is difficult to close by the subsequent reaction. Such porosity may result in a substantial impairment of the mechanical properties of the ceramics.

(c) Oxidation of aluminum to aluminum oxide results in a relatively small volume increase of 28.8% by volume as compared to the oxidation of SiC (120% by volume) or silicon metal (127% by volume) to $SiO_2$. A further argument against the use of aluminum is that the oxidation (i.e. volume expansion) and sintering shrinkage of the ceramics proceed in different temperature ranges, resulting in large volume changes during the process.

(d) The crystalline aluminum oxide phase formed by oxidation exhibits only a poor sintering capability which is reflected by low final densities and a high volume expansion of the molded parts after annealing at temperatures of less than 1500° C.

(e) Aluminum powders of the required fineness are combustible and in part even explosive which requires cumbersome safety measures. In order to solve this problem, a combination of attritor milling in acetone and subsequent spray-drying can be employed, for example. However, both methods are very tedious and expensive; in addition, the safety problem remains.

A relatively high volume increase at higher temperatures (>1000° C.) can be achieved by using SiC as the silicon source. However, the carbon dioxide ($CO_2$) produced in the oxidation of SiC must be removed from the reaction boundary. This countercurrent gas stream inevitably reduces the transport of oxygen to the reaction zone and thus reduces the reactivity, especially at low process temperatures.

However, a quasi volume-constant (close to final contour) preparation process of the molded part is desirable in order to avoid damages to the material, for instance, to the fibers incorporated in the matrix. Also, tedious after-processing of the ceramic body can thus be essentially dispensed with. In addition, very complex shapes can be easily realized. This is enabled by the reaction bonding process in which the shrinking of the green body during sintering and the subsequent mullitization is completely (or for the most part) compensated. This can be achieved by an appropriate combination of starting materials; in particular, the volume shrinkage can be compensated with the oxidation of metal powders and the volume expansion by the uptake of oxygen associated therewith. A limit to the maximum process temperature is provided by the maximum temperature at which the commercially available ceramic fibers can be employed. In order to keep the impairment of the mechanical properties of these fibers low, a minimization of the process temperatures is to be sought.

Beneficial mechanical properties, especially a high breaking strength, can be achieved by a homogeneous microstructure with low porosity and a narrow grain size distribution.

For overcoming the difficulties of the prior art, the use of silicon metal as the silicon source and of corundum ($\alpha$-$Al_2O_3$) ceramic powder as the aluminum source is preferred according to the invention. For increasing the reactivity and for densification, elements of the third subgroup (Sc, Y, La) and rare earth elements (Ce . . . Lu) are added which, after the process in a temperature range of below 1400° C., will form the crystalline phase thortveitite or an analogous silicate structure ($Me_2Si_2O_7$ in general), or, in the case of Ce, remain in the ceramics as cerianite, $CeO_2$. For accelerating the mullitization, highly reactive mullite precursor powders of various grain sizes (preferably about 0.1 $\mu$m) are optionally admixed as homogeneous crystallization nuclei.

Accordingly, a first embodiment of the present invention consists in reaction bonded mullite-containing ceramic molded parts, obtainable by the heat-treatment of a finely dispersed mixture of an aluminum-containing material, a silicon-containing material, and a rare earth metal-containing material in an oxygen-containing atmosphere.

Particularly preferred according to the present invention is to obtain ceramic molded parts containing reinforcing fiber materials and/or functional elements, optionally in an amount of from 5 to 50% by volume. Particularly preferred in this context are long-fiber reinforced ceramic molded parts, i.e. those in which the fiber is continuously present through the whole material. Similarly, it is also possible to incorporate tissues in the ceramic molded parts. Preferably, the non-shrinking reinforcing and/or functional elements have dimensions of between 5 and 500 $\mu$m. These insert elements preferably consist of high-temperature resistant oxides, carbides, nitrides, silicides and/or borides.

The mullite content obtainable with the present invention is preferably from 50% to 99.9% by weight, in particular from 80% to 95% by weight.

An essential feature of the present invention is the presence of elements of the third subgroup or of the lanthanides. It is particularly preferred to select the rare earth metals according to the present invention from yttrium and/or cerium. The rare earth metals may also be present as components of zirconia/rare earth metal oxide mixed crystals, especially in the form of yttrium-containing zirconia.

It is particularly preferred according to the present invention that the ceramic molded part comprise rare earth metals in an amount of from 0.1 to 10% by weight, in particular from 1 to 5% by weight.

A further object of the present invention is a process for the preparation of said ceramic molded parts, characterized in that a finely dispersed mixture of an aluminum-containing material, a silicon-containing material, and a rare earth metal-containing material is subjected to a heat treatment in an oxygen-containing atmosphere.

According to the invention, such heat treatment is preferably performed at a temperature in the range of from 1200 to 1500° C., in particular in the range of from 1300 to 1450° C.

It is neither required nor desired to heat the green body to higher temperatures, so that reinforcing and/or functional elements incorporated in the ceramic molded part can withstand such heat treatment.

The aluminum-containing material is preferably selected from aluminum hydroxide, sulfate, nitrate, nitride and/or oxide. Optionally, up to 10% by weight of the aluminum-containing material may be employed in the form of aluminum powder. This small fraction of aluminum powder is neither explosive nor inflammable.

The silicon-containing material is especially selected from silicon metal, silicon carbide, silicon oxide, silicon nitride and zirconium silicate, preferably silicon metal.

According to the invention, a mullite precursor powder may optionally be added to the reaction mixture in an amount of from 0% to 50% by weight, in particular from 5% to 15% by weight.

The reaction bonded mullite-containing ceramic molded parts prepared according to the invention may be employed for various applications. Accordingly, a further embodiment of the present invention consists in the use of the above-mentioned reaction bonded mullite-containing ceramic molded parts as wear-resistant and/or high-temperature resistant components in the construction of machines, apparatus and engines, as cutting tools, as a bearing and/or sealing element, as a functional element in electronic equipment, and in combustion chambers of mobile and stationary turbines.

The advantages of this new development are, in detail:

(a) Corundum and silicon metal powders as examples of the aluminum- and silicon-containing materials are commercially available without difficulty. Due to their brittleness and passivity they can be rapidly ground and homogenized to the necessary fineness in planetary ball mills without hazardous solvents, and cumbersome spray-drying can be omitted.

(b) The oxidation of the silicon metal results in a relatively large volume increase and takes place to an appreciable extent only from about 800° C. As compared with the oxidation of SiC, half the amount of oxygen is consumed in the formation of the same quantity of $SiO_2$ with no other reaction product forming which would have to be removed from the reaction zone. The maximum oxidation rate is achieved above 1000° C., i.e. in a range in which the volume shrinking by sintering begins before the volume expansion caused by the mullitization takes place. Thus, a nearly simultaneous compensation of the sintering shrinkage by the volume increase due to oxidation can be achieved.

(c) The oxidation of the silicon metal produces amorphous $SiO_2$. This $SiO_2$ exhibits a high sintering capability because of viscous flow. A high densification of the green body at a lower temperature (<1400° C.) is thereby achieved. This results in a significant facilitation of the diffusion required for complete mullitization.

(d) The addition of the above-mentioned elements causes a reduction of the viscosity of the amorphous $SiO_2$ formed by the oxidation and thus facilitates the densification of the ceramics by liquid-phase sintering. At the same time, the viscosity reduction facilitates the diffusion of oxygen through the amorphous $SiO_2$ layer to the Si metal, resulting in a significantly shortened reaction time at temperatures of less than 1400° C. In the case of $CeO_2$, possibly, a catalyzed oxidation has to be considered. Since these elements are not incorporated in the mullite structure or only so to a very small extent, they form independent crystalline silicate phases or are present as oxides in the ceramics. These minor phases are oxidation resistant, have high melting points (above 1800° C. for the thortveitites and above 2600° C. for cerianite) and affect the mechanical properties of the ceramics only to a small extent. The maximum amount of these phases and the residual amount of $Al_2O_3$ can be adjusted by the amount of the above elements employed and the silicon-to-aluminum ratio.

(e) The calcination temperature of the mullite precursors has an influence on the green density and the microstructure of the ceramics. Since the mullite crystals serve as crystallization nuclei in the system, their size and number affects the density of nuclei and thus the grain size distribution and the porosity of the ceramics.

(f) Experiments show that the addition of a few percent by weight (<3%) of quartz while maintaining the adjusted stochiometry has a positive influence on the matrix microstructure.

EXAMPLES

Example 1

Commercial silicon metal powder (H.C. Starck GmbH, Goslar) having a specific surface area of 3.6 $m^2/g$ was premilled in a planetary ball mill (Retzsch company, Haan) for 48 h using low-abrasion $Si_3N_4$ milling balls and 1-propanol (Merck AG, Darmstadt) as milling media. The powder was subsequently dried in a vacuum rotary evaporator and passed through a 125 μm screen. The rubbedoff material from the milling balls was determined by gravimetry to be less than 0.1% by weight, elemental contaminations being basically minute due to the choice of the milling ball material and the use of polyamide milling cups. After the milling process, the specific surface area was determined to be about 9 $m^2/g$.

Quartz powders (Novacite® L337, Chemag AG, Frankfurt) were milled in a way similar to that of silicon premilling. The specific surface area after milling was determined to be about 6 $m^2/g$.

Mullite precursor powders (Siral® II, Condea Chemie, Hamburg) which, as supplied, consist of amorphous $SiO_2$ and $Al_2O_3$ were precalcined at 1200° C. for 5 h. The specific surface area of more than 100 $m^2/g$ measured as supplied was thereby reduced to about 50 $m^2/g$. Part of this calcined powder was subsequently annealed at 1350° C. for another 2 h, reducing the specific surface area to about 25 $m^2/g$. From powder-diffraction analyses, it could be seen that the formation of mullite crystals in these powders had proceeded far.

Further, corundum powder (Martoxid® CS400/M, Martinswerk, Bergheim) having a specific surface area of about 9 $m^2/g$, $Y_2O_3$ powder (99.9% pure, H. C. Starck GmbH, Goslar) having a specific surface area of 16 $m^2/g$, and $CeO_2$ powder (Auer-Remy GmbH, Hamburg) served as starting materials.

13.47 g of silicon, 75.83 g of corundum, 4.75 g of mullite from the precursor calcined at 1350° C., 0.95 g of quartz and 5 g of yttrium oxide were homogenized in a planetary ball mill in polyamide cups with 200 g of silicon nitride milling balls and 300 g of 1-propanol for 1 h. The powder mixture was dried in a vacuum rotary evaporator at 90° C. and 300 to 20 mbar. The powder mixture was passed through a 250 μm screen, followed by a treatment in an eccentric tumbling mixer (System Schatz, W. A. Bachofen, Switzerland) to form the powders into granules. About 2.5 g each of powder was pressed into rods of about 55×5×4 mm with an uniaxially directed pressure of 55 MPa. These rods were subsequently incapsulated in latex coats under vacuum and isostatically pressed cold at 200 MPa. A pressed rod from this powder mixture was heated to 1350° C. in a box furnace in air at a heating rate of 3° C./min and maintained there for 24 h. The density of the sample was determined to be 2.44 $g/cm^3$ by the Archimedean method, corresponding to a densification of about 75% with respect to the theoretical density. X-ray analysis on a powder diffractometer revealed that, in addition to mullite as the main component, small amounts of Y-thortveitite ("keiviite") and corundum were present in the sample as crystalline phases (corundum, about 7% by weight; Y-thortveitite, about 7.5% by weight). There were no indications of the formation of essential amounts of amorphous phase. The volume change of the sample was determined by measuring to be −5.5% by volume.

Another pressed rod was heated to 1350° C. at a heating rate of 2° C./min and maintained there for 5 h. The density of the sample was 2.42 $g/cm^3$, corresponding to a densification of about 74% with respect to the theoretical density. X-ray analysis revealed the same phases to be present as above. The volume change of the sample was determined to be −3.75% by volume.

Example 2

A powder mixture having the same chemical composition as in example 1, but comprising mullite from the precursor calcined at 1200° C., was processed in analogy to example 1 and molded into pressed rods. A sample was heated to 1350° C. at a heating rate of 2° C./min and maintained there for 5 h. The density of the sample was 2.43 $g/cm^3$, corresponding to a densification of about 75% with respect to the theoretical density. X-ray analysis revealed the same phases to be present as in example 1. The volume change of the sample was −2.0% by volume.

Example 3

A powder mixture consisting of 13.75 g of silicon, 77.43 g of corundum, 4.85 g of mullite from the precursor calcined at 1350° C., 0.97 g of quartz and 3 g of yttrium oxide was processed in analogy to example 1 and molded into pressed rods. A sample was heated to 1400° C. at a heating rate of 3° C./min and maintained there for 24 h. The density of the sample was 2.68 $g/cm^3$, corresponding to a densification of about 83% with respect to the theoretical density. X-ray analysis revealed the same phases to be present as in example 1, with the fraction of corundum being about 4% by weight, and the fraction of Y-thortveitite being about 5% by weight. The volume change of the sample was −6.0% by volume.

Example 4

To 60 g of a powder mixture having the same composition as in example 3, there was added 30 g of deionized water, 0.3 g of palmitic acid (Loxiol® EP 278, Henkel KGaA, Düsseldorf), 0.1 g of monoglyceride (Arylpon® 90-25, Grünau GmbH, Illertissen), 0.3 g of wetting agent (Arlypon® V37802, Grünau GmbH, Illertissen), and 0.2 g of hydroxypropylcellulose (Klucel® J, Hercules Inc., Wilmington, USA). Homogenization of the slip was performed in a planetary ball mill for 1 h using $Si_3N_4$ milling balls. Gas bubbles present in the slip were subsequently removed with a magnet stirrer under vacuum, and the slip was cast in the form of plates onto gypsum substrates. The organic additives were burned off at a heating rate of 0.6° C./min and a temperature of 550° C. in a resistance-heated laboratory oven. A sample was heated to 1350° C. at a heating rate of 2° C./min and maintained there for 5 h. The density of the sample was 2.5 g/cm³, corresponding to a densification of about 80% with respect to the theoretical density. X-ray analysis revealed the same phases to be present as in example 3.

Example 5

A powder mixture consisting of 13.12 g of silicon, 73.89 g of corundum, 4.63 g of mullite from the precursor calcined at 1350° C., 0.93 g of quartz and 7.43 g of cerium oxide was processed in analogy to example 1 and molded into pressed rods. A pressed rod from this powder mixture was heated to 1350° C. at a heating rate of 3° C./min and maintained there for 24 h. The density of the sample was 2.67 g/cm³, corresponding to a densification of about 82% with respect to the theoretical density. X-ray analysis revealed that $CeO_2$ ("cerianite") and corundum were present in the sample as crystalline phases in addition to mullite. No indication of the formation of a cerium-silicon or cerium-aluminum compound or of an amorphous phase could be detected. It followed that 7.4% of cerianite and a maximum of 92.6% of mullite were present in the sample as crystalline phases. The volume change of the sample was −8.5% by volume. Another pressed rod was heated to 1350° C. at a heating rate of 2° C./min and maintained there for 5 h. The density of the sample was 2.62 g/cm³, corresponding to a densification of about 80% with respect to the theoretical density. X-ray analysis revealed the same phases to be present. The volume change of the sample was −5.0% by volume.

Example 6

60 g of a powder mixture consisting of 13.47 g of silicon, 75.83 g of corundum, 4.75 g of mullite from the precursor calcined at 1350° C., 0.95 g of quartz and 5 g of cerium oxide was processed into a slip and cast in analogy to example 4 using usual pressing aids (organic additives) and deionized water. After burning off the organic components at 550° C., the sample was heated to 1350° C. at a heating rate of 4° C./min and maintained there for 2 h. The density of the sample was 2.60 g/cm³, corresponding to a densification of about 80% with respect to the theoretical density. X-ray analysis revealed the same phases to be present as in example 5.

Example 7

A continuous fiber bundle of a mullite-based oxide fiber (Nextel® 720, 3M, Neuss) was infiltrated with a slip in analogy to example 6. The still moist fiber bundle was wrapped around a cuboid gypsum block in such a way that the fiber bundles constituted a fiber-reinforced green body with parallel fiber orientation. The fiber-reinforced green body was divided into four parts and subjected to a temperature treatment in analogy to example 6. A flat mullite matrix/mullite fiber composite material resulted having the same phase composition as in example 6.

Example 8

In analogy to example 7, a fiber bundle was infiltrated with the slip. The fiber bundle was wrapped around a cylinder-shaped gypsum block in analogy to example 7. After releasing the green body from the gypsum mold and a temperature treatment in analogy to example 7, a tube-like mullite matrix/mullite fiber composite material resulted having the same phase composition as in example 6.

What is claimed is:

1. A process for preparing a mullite-containing ceramic molded part comprising:

providing a finely dispersed mixture comprising an aluminum-containing material, a rare earth metal oxide, and a silicon-containing material selected from the group consisting of silicon metal, silicon carbide, silicon nitride, zirconium silicate, and mixtures thereof; and subjecting said finely dispersed mixture to a heat treatment in an oxygen-containing atmosphere to form a ceramic molded part containing from 50% to 99.9% mullite by weight.

2. The process of claim 1, wherein said heat treatment is performed at a temperature of 1200° C. to 1500° C.

3. The process of claim 1, wherein said heat treatment is performed at a temperature of 1300° C. to 1450° C.

4. The process of claim 1, wherein said aluminum-containing material is selected from the group consisting of aluminum hydroxide, aluminum sulfate, aluminum nitrate, aluminum nitride, aluminum oxide, and mixtures thereof.

5. The process of claim 1, wherein said finely dispersed mixture comprises up to 50% mullite precursor powder by weight.

6. The process of claim 1, wherein said finely dispersed mixture comprises from 5% to 15% mullite precursor powder by weight.

7. A ceramic molded component prepared by the process of any one of claims 1 to 6, said component selected from the group consisting of an engine component, a machine component, a cutting tool, a bearing, a sealing element, an electronic component, a combustion chamber component for a mobile turbine, and a combustion chamber component for a stationary turbine.

8. The ceramic molded component of claim 7, further comprising from about 5% to about 50% by volume of at least one fiber selected from the group consisting of oxide fibers, carbide fibers, nitride fibers, silicide fibers, and boride fibers.

9. The ceramic molded component of claim 7, comprising from 80% to 95% mullite by weight.

10. The ceramic molded component of claim 7, comprising from 0.1% to 10% rare earth metal oxide by weight.

11. The ceramic molded component of claim 7, comprising from 1% to 5% rare earth metal oxide by weight.

* * * * *